US012618270B2

(12) United States Patent
Vietti et al.

(10) Patent No.: US 12,618,270 B2
(45) Date of Patent: May 5, 2026

(54) DOOR HANDLE APPARATUS

(71) Applicant: U-Shin Italia S.p.A., Pianezza (IT)

(72) Inventors: Andrea Vietti, Pianezza (IT); Anthony Guerin, Pianezza (IT)

(73) Assignee: U-Shin Italia S.p.A., Pianezza (IT)

( * ) Notice: Subject to any disclaimer, the term of this patent is extended or adjusted under 35 U.S.C. 154(b) by 161 days.

(21) Appl. No.: 17/378,211

(22) Filed: Jul. 16, 2021

(65) Prior Publication Data

US 2022/0018165 A1 Jan. 20, 2022

(30) Foreign Application Priority Data

Jul. 16, 2020 (EP) .................................... 20186194

(51) Int. Cl.
*E05B 79/06* (2014.01)
*E05B 85/06* (2014.01)
*E05B 85/16* (2014.01)

(52) U.S. Cl.
CPC .............. *E05B 79/06* (2013.01); *E05B 85/06* (2013.01); *E05B 85/16* (2013.01)

(58) Field of Classification Search
CPC ........... E05B 79/06; E05B 85/06; E05B 85/16
See application file for complete search history.

(56) References Cited

U.S. PATENT DOCUMENTS

2017/0002589 A1* 1/2017 Toyama .................. E05B 17/18

FOREIGN PATENT DOCUMENTS

DE 4445320 A1 * 8/1996 ............. E05B 85/16
EP 1026347 8/2000
EP 3048227 7/2016
EP 3575524 12/2019
EP 3575524 A1 * 12/2019 ............. E05B 79/06
WO 2020012261 1/2020

OTHER PUBLICATIONS

European Search Report for corresponding EP Application No. 20186194, issued Dec. 8, 2020.

* cited by examiner

*Primary Examiner* — Kristina R Fulton
*Assistant Examiner* — Thomas L Neubauer
(74) *Attorney, Agent, or Firm* — Burris Law, PLLC

(57) ABSTRACT

A door handle apparatus includes a frame member, a handle body, and a retainer. The frame member is configured to be assembled on a door outer panel that forms an outer surface of a vehicle door. The handle body is configured to be mounted on the frame member via a first arm portion and a second arm portion. The handle body is configured to be rotatable relative to the frame member at the first arm portion. The retainer is mounted on the frame member and moveable between an assembly ready position and an assembly completion position. When the retainer is in the assembly ready position, the handle body is moveable within the frame member. When the retainer is in the assembly completion position, the retainer maintains the second arm portion of the handle body in cooperation with a door opening member mounted on the frame member.

20 Claims, 4 Drawing Sheets

DOOR HANDLE APPARATUS

CROSS-REFERENCE TO RELATED APPLICATIONS

This application claims priority to and the benefit of EP 20186194.5, filed on Jul. 16, 2020. The disclosures of the above applications are incorporated herein by reference.

FIELD

The present disclosure relates to a door handle apparatus.

BACKGROUND

The statements in this section merely provide background information related to the present disclosure and may not constitute prior art.

The door handle apparatuses commonly include a handle body and a frame member. The handle body usually includes two parts: one moveable part relative to the frame member, to latch or unlatch the door and a fixed part relative to the frame member, which may cover a lockset. For mounting of two-part handle body, the user first assembles the moveable part on the frame member with a rotation movement and then a translation movement. Then, the lockset is mounted and fixed on the frame member. Then, the fixed part is mounted and fixed on the frame member to cover the lockset.

However, in some applications, a one part handle body of door handle apparatuses may be desired. The lockset must therefore be mounted on the frame member before the one-part handle body. The mounting of a one-part handle body is thus more difficult to achieve.

The present disclosure provides a one-part handle body mounted on a frame member of a door handle apparatus.

SUMMARY

This section provides a general summary of the disclosure and is not a comprehensive disclosure of its full scope or all of its features.

In one form, the present disclosure provides for a door handle apparatus that includes a frame member, a handle body, and a retainer. The frame member is configured to be assembled on a door outer panel that forms an outer surface of a vehicle door. The handle body is configured to be mounted on the frame member via a first arm portion and a second arm portion. The handle body is configured to be rotatable relative to the frame member at the first arm portion. The retainer is mounted on the frame member and moveable between an assembly ready position and an assembly completion position. When the retainer is in the assembly ready position, the handle body is moveable within the frame member. When the retainer is in the assembly completion position, the retainer maintains the second arm portion of the handle body in cooperation with a door opening member, mounted on the frame member.

Thanks to the retainer, the handle body is maintained in cooperation with the door opening member when mounted on the frame member and therefore, the engagement between the handle body and the door opening member is improved. In the meantime, when the retainer is in the assembly ready position, the mounting of the door handle is allowed and facilitated. The retainer may be added to pre-existing frame members. Therefore, the costs to retrofit the handle apparatuses to one-part handle bodies is reduced.

In addition, the frame members that may be used for a vehicle that is equipped with both one-piece handle bodies and two-piece handle bodies may be the same. In case a two-piece handle body is to be mounted on the frame member according to the present disclosure, only the retainer is to be removed. Therefore, the door handle apparatus according to the present disclosure is easily adaptable and includes cost savings.

According to one form, the handle body may be in a disassembled position, wherein the handle body is not mounted on the frame. When the handle body is in the disassembled position, the retainer is in the assembly ready position.

According to another form, the handle body may be in a pre-assembly position, wherein the first arm and second arm are positioned within the frame. In this position, the handle body is moveable within the frame and the retainer is in the assembly ready position.

According to yet another form, the handle body may be in a cooperation position, wherein the second arm portion of the handle body is in cooperation with the door opening member.

According to one form, the handle body may be in an opening position, wherein the handle body is rotated at the first arm portion about a rotation axis. In this position, the door opening member is activated and the door may open.

According to another form, when the retainer is in the assembly ready position, the handle body is moveable within the frame member, between the pre-assembly position and the cooperation position, in a direction substantially perpendicular to the axis of rotation of the handle body.

According to yet another form, when the retainer is in the assembly completion position, the handle body is maintained in cooperation with the door opening member, and is moveable between the cooperation position and the opening position.

According to one form, the handle body may be rotatable between the cooperation position and the opening position.

According to another form, the handle body may rotate about the rotation axis between the cooperation position and the opening position.

In the following description, positioning terms such as front, back, left, right, etc., refer to an orthogonal basis comprising the following three directions: front-back, left-right and top-bottom. In this description, these three directions correspond to the usual directions associated with the motor vehicle. However, in other forms of the present disclosure, the directions front-back, left-right and top-bottom could be any set of arbitrary directions forming an orthogonal basis.

According to one form, when the retainer is in the assembly ready position, the handle body is moveable in translation in a front-back direction.

According to another form, the handle body may be in one part.

According to yet another form, the door handle apparatus may include a lockset mounted in the frame member.

According to yet another form, the door handle apparatus may include a displacement member configured to displace the retainer from the assembly ready position to the assembly completion position.

Thanks to the displacement member, the retainer may easily be moved from the assembly ready position to the assembly completion position.

According to one form, the retainer may be moveable in translation between the assembly ready position and the assembly completion position.

According to another form, the retainer may be moveable in the front back direction.

According to yet another form, the displacement member may be mounted on the frame member and is configured to be actuated between a first position and a second position.

According to yet another form, the displacement member is accessible for the user when the handle body is in the pre-assembly position or the cooperation position. Thus, the mounting of the door handle apparatus is facilitated.

According to yet another form, the displacement member may be accessible from a side of the frame member by a user to be actuated between the first and second positions.

According to one form, for example, the frame member includes a hole configured to allow access to the displacement member via a tool. For example, the tool may be a screwdriver.

According to another form, when the frame member is mounted on the vehicle door, a side of the vehicle door may include a hole to allow access to the displacement member via a tool, such as a screwdriver.

According to yet another form, when the displacement member is actuated between the first and the second positions, the retainer may be displaced from the assembly ready position to the assembly completion position, respectively.

According to one form, when the displacement member is moved from the first position to the second position, the displacement member may push the retainer from the assembly ready position to the assembly completion position.

According to another form, when the retainer is in the assembly ready position, the displacement member may be in the first position and may be in contact with the retainer. The retainer is thus displaced as soon as the displacement member is actuated. Therefore, the user does not have to actuate the displacement member to contact the retainer, before starting to displace the retainer.

According to yet another form, in the second position, the displacement member may maintain the retainer against the second arm portion of the handle body.

According to yet another form, in the second position, the retainer is in the assembly completion position and the handle body is in the cooperation position.

According to one form, the displacement member may include a threaded portion configured to cooperate with the frame member, in particular with a tapped portion of the frame member.

According to another form, the displacement member may be actuated by a rotating movement, for example in case of the use of a tool such as a screwdriver.

According to yet another form, the displacement member may also by actuated by a pushing movement, for example via a tool.

According to one form, the door handle apparatus may include a lockset mounted on the frame member. The lockset being configured to be covered by the handle body.

According to another form, in the second position, the displacement member may be configured to secure the lockset relatively to the frame member.

In another form, the door handle apparatus may not include any lockset. In such a form, the lockset may be replaced by a dummylock.

According to yet another form, in the second position, the displacement member may be configured to secure the dummylock relatively to the frame member.

According to yet another form, in the second position, the displacement member secures the lockset or the dummylock relatively to the frame member and maintains the retainer in the assembly completion position.

According to one form, the displacement member may have the shape of a fork.

Thanks to the features of the present disclosure described above, the displacement member and the retainer may be made of different materials. For example, the displacement member may be of a material that is able to resist efforts applied to the lockset. For example, the displacement member may be made of metal, for example steel, or Zamac, i.e., an alloy comprising zinc, aluminum, magnesium and copper. For example, the retainer may be made of a material that has a relatively low friction coefficient, for example plastic.

Further advantages and advantageous features of the door handle apparatus are disclosed in the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
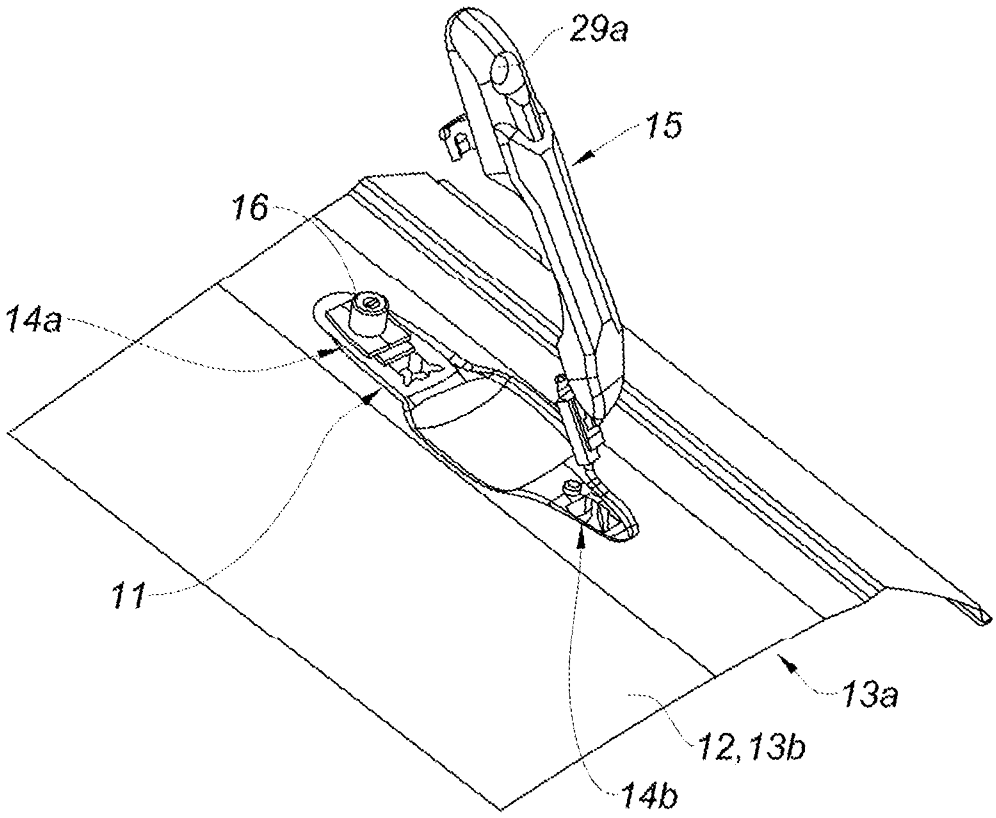
FIG. 1 is a perspective view of a door handle apparatus in a disassembled state according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
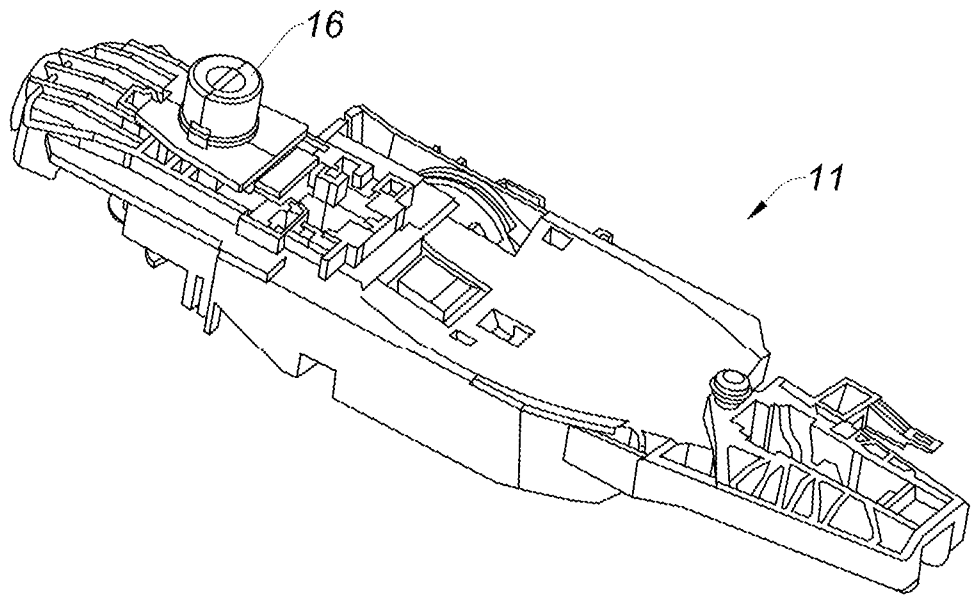
FIG. 2 is a perspective view of a frame member of the door handle apparatus of FIG. 1.

The disclosure provides a door handle apparatus represented in FIG. 1 in a disassembled state. With reference to FIGS. 1 and 2, the door handle apparatus includes a frame member 11. The frame member 11 is configured to be assembled on a door outer panel 13. The door outer panel 13 includes an inner surface 13*a* and an outer surface 13*b* that constitutes an outer surface 12 of a vehicle door. The frame member 11 is mounted on the door outer panel 13 facing the inner surface 13*a*. The outer door panel 13 includes openings 14*a*, 14*b*. The frame member 11 is accessible from the outer surface 13*b* through the openings 14*a*, 14*b*.

A lockset 16 is mounted on the frame member 11. The lockset 16 protrudes from the opening 14*a*.

Figure 3:
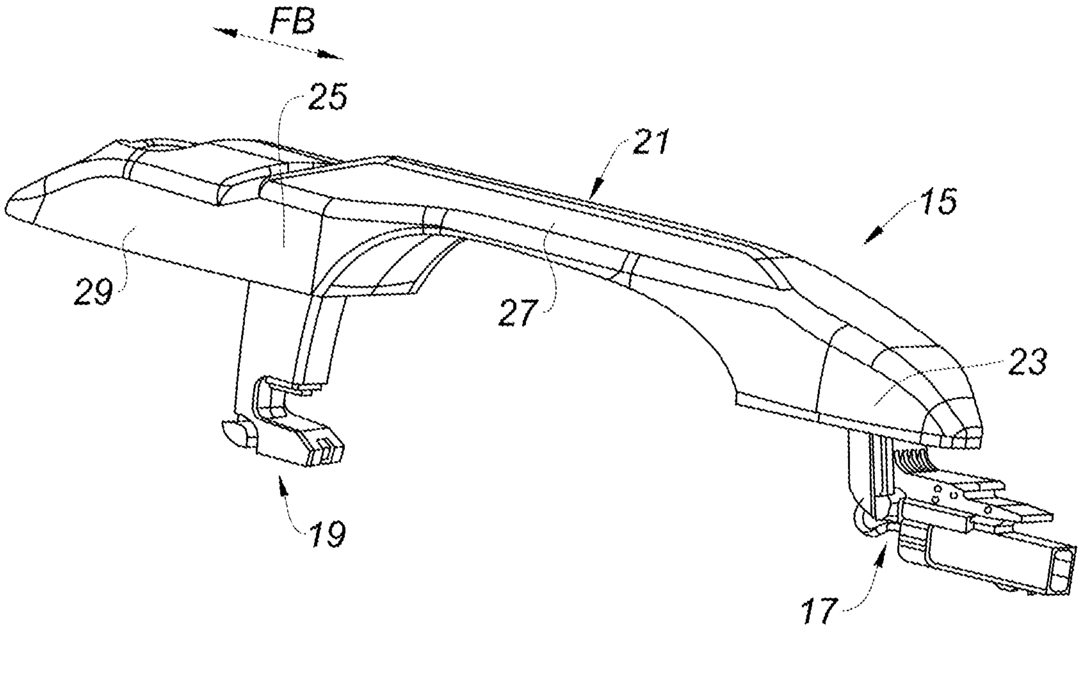
FIG. 3 is a perspective view of a handle body of the door handle apparatus of FIG. 1.

With additional reference to FIG. 3, the door handle apparatus includes a handle body 15 including a first arm portion 17, a second arm portion 19 and a main part 21. The main part 21 of the handle body 15 is in one part. The main part 21 is elongated and extends in a first direction FB, which correspond to the front-back direction when the handle body 15 is mounted on the frame member 11 on the door of the vehicle.

The main part 21 includes a first fixing portion 23. The first arm portion 17 is fixed at the first fixing portion 23.

The main part 21 includes a second fixing portion 25. The second arm portion 19 is fixed at the second fixing portion 25.

The main part 21 further includes a gripping portion 27 configured to be gripped by a user to open the door. The gripping portion 27 is situated between the first fixing portion 23 and the second fixing portion 25, according to the first direction FB. The first fixing portion 23 is situated between a first extremity of the main part 21 and the gripping portion 27, according to the first direction FB.

The main part 21 further includes a covering portion 29 configured to cover the lockset 16 when the handle body 15 is mounted on the frame member 11. The covering portion 29 includes an opening 29*a* (FIG. 1). A key hole of the lockset 16 is accessible through the opening 29*a* when the handle body 15 is mounted on the frame member 11. The covering portion 29 is situated between a second extremity of the main part 21 and the second fixing portion 25, according to the first direction FB. The second fixing portion 25 is situated between the gripping portion 27 and the covering portion 29, according to the first direction FB.

In FIG. 1, the handle body 15 is in a disassembled position, wherein the handle body 15 is not mounted on the frame member 11.

To mount the handle body 15 on the frame member 11, the user first introduces the handle body 15 in the frame member 11, in a pre-assembly position, wherein the first arm portion 17 and second arm portion 19 are positioned within the frame member 11. To do so, the user first introduces the first arm portion 17 into the opening 14*b*, and then rotates the handle body to introduce the second arm portion 19 into the opening 14*a*.

Figure 4:
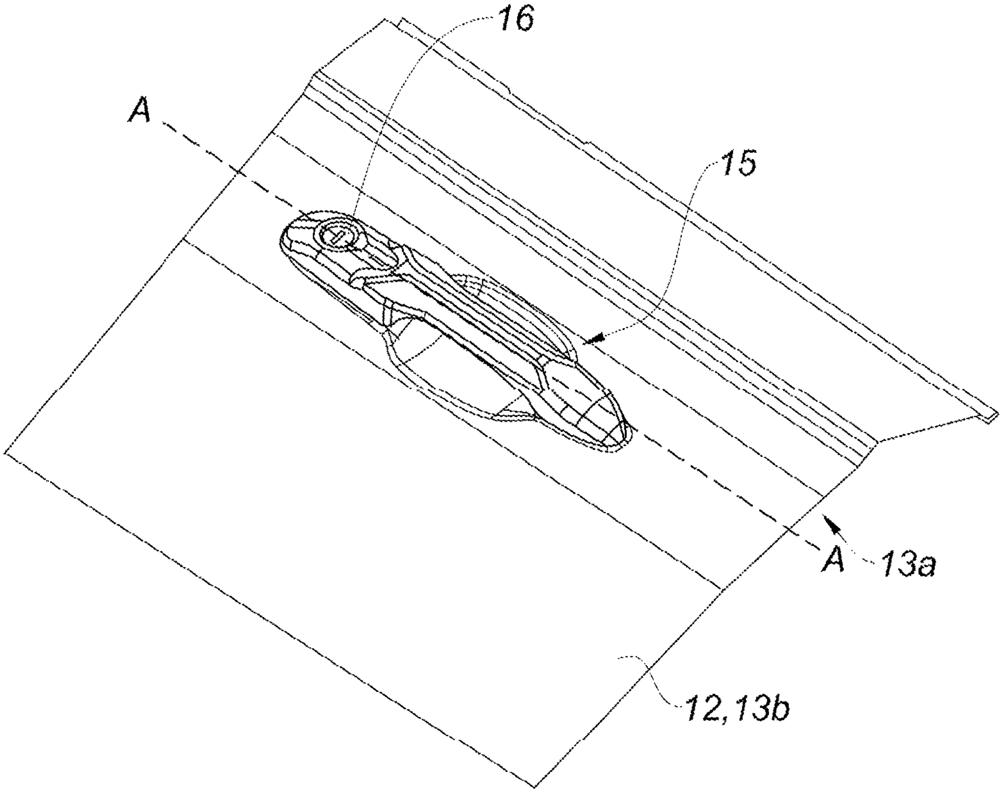
FIG. 4 is a perspective view of the door handle apparatus of FIG. 1 in an assembled state.
Figure 5:
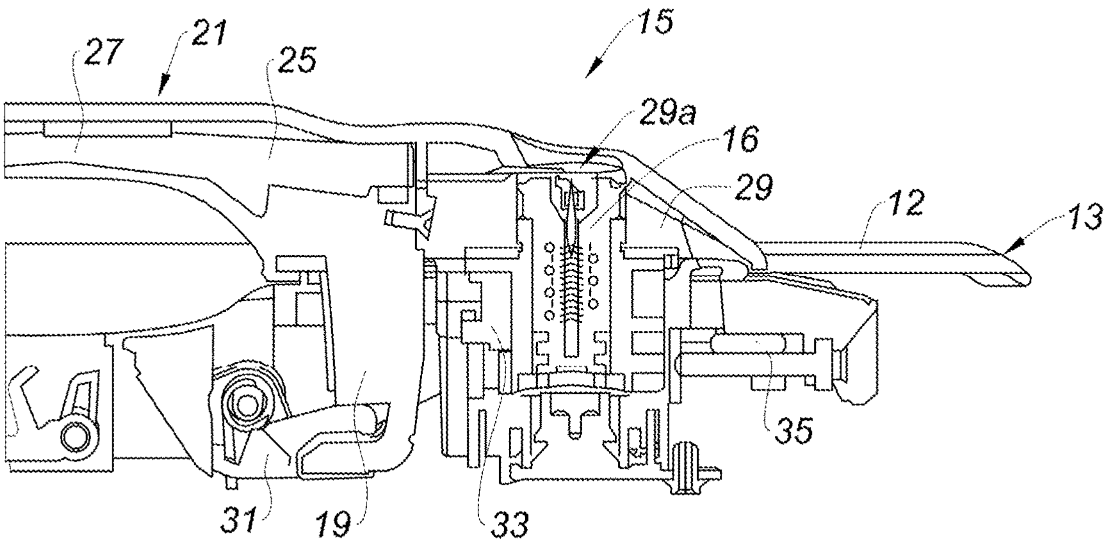
FIG. 5 is a cross-sectional view of the door handle apparatus of FIG. 1 according to line A-A shown in FIG. 4 wherein a retainer of the door handle assembly is in an assembly ready position.

With additional reference to FIGS. 4 and 5, then, the handle body 15 may be moved in a cooperation position wherein the second arm portion 19 of the handle body 15 is in cooperation with a door opening member 31 and the first arm portion 17 is in cooperation with a shaft (not represented), defining a rotation axis of the handle body 15. The rotation axis of the handle body is substantially perpendicular to the first direction FB, and correspond to the left-right direction when the handle body is mounted on the frame member 11 on the vehicle door.

When the handle body 15 is in the cooperation position, if a user pulls the gripping portion 27 of the main part 21, the handle body 15 rotates about the rotating axis toward an opening position, wherein the door opening member 31 is activated and the door may open.

Figure 6:
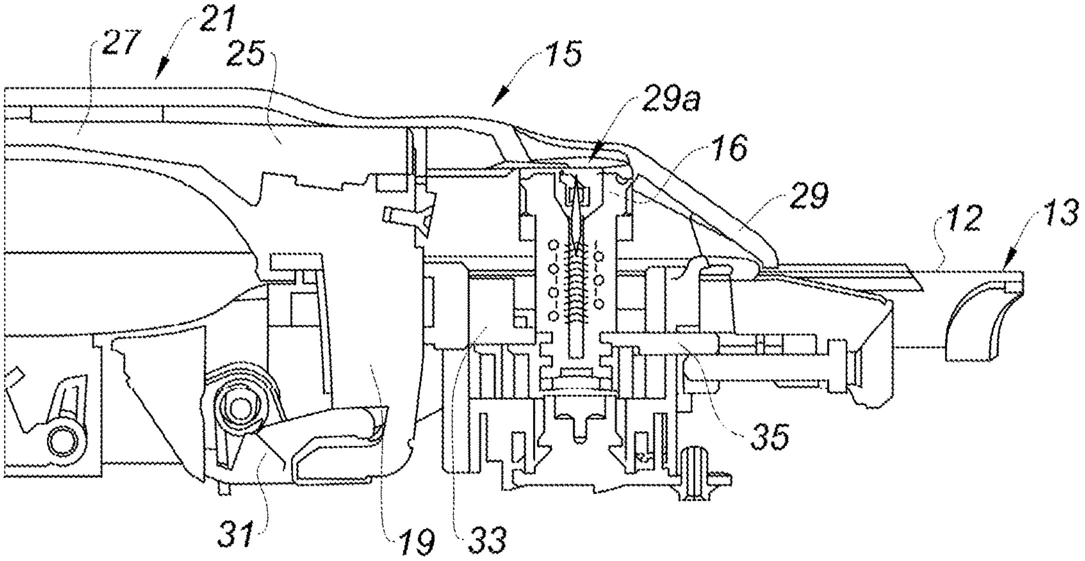
FIG. 6 is a cross-sectional view similar to FIG. 5 wherein the retainer is in an assembly completion position.

With additional reference to FIGS. 5 and 6, the door handle apparatus includes a retainer 33 mounted on the frame member 11 and moveable between an assembly ready position (FIG. 5) and an assembly completion position (FIG. 6).

When the retainer 33 is in the assembly ready position, the handle body 15 may be introduced into the frame member 11, between the disassembled position and the pre-assembly position. The handle body 15 is also moveable within the frame member 11 between the pre-assembly position and the cooperation position, in translation according to the first direction FB.

When the retainer 33 is in the assembly completion position, the retainer 33 is configured to maintain the second arm portion 19 of the handle body 15 in cooperation with the door opening member 31. The handle body 15 is therefore only moveable between the cooperation position and the opening position.

The door handle apparatus further includes a displacement member 35 configured to displace the retainer 33 from the assembly ready position to the assembly completion position. The displacement member 35 is also configured to secure the lockset 16 on the frame member 11. The displacement member 35 is mounted on the frame member 11 and is configured to be actuated by a user between a first position and a second position. Indeed, the displacement member 35 is accessible from a side of the frame member 11. For example, the frame member 11 includes a hole, configured to allow access to the displacement member 35 via a tool, such as a screwdriver. When the frame member 11 is mounted on the vehicle door, a side of the vehicle door may include a hole to allow the access to the displacement member 35 via the tool.

The displacement member 35 may include a threaded portion configured to cooperate with a tapped portion of the frame member 11, and may therefore be easily actuated by the means of a screwdriver or the like.

Figure 7:
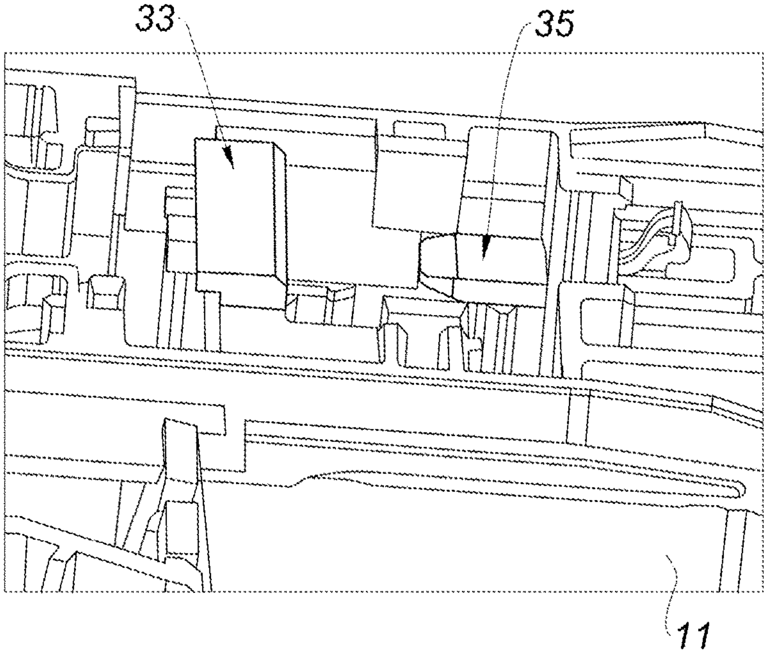
FIG. 7 is a perspective view of the door handle apparatus of FIG. 1, illustrating the retainer and a displacement member when the retainer is in the assembly ready position.

When the displacement member 35 is actuated between the first and the second positions, the retainer 33 is displaced from the assembly ready position to the assembly completion position, respectively. For example, when actuated, the displacement member 35 pushes the retainer 33 from the assembly ready position to the assembly completion position. As shown in FIG. 7, when the retainer 33 is in the assembly ready position, the displacement member 35 is in the first position and is in contact with the retainer 33. In the second position, the displacement member 35 maintains the retainer against the second arm portion 19 of the handle body 15 and secures the lockset 16 on the frame member 11.

The disclosure is not limited to the forms described above by way of examples but it rather comprises all the technical equivalents and variants of the means described as well as their combinations.

It is to be understood that the present disclosure is not limited to the forms described above and illustrated in the drawings; rather, the skilled person will recognize that many changes and modifications may be made within the scope of the appended claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A door handle apparatus, comprising:

a frame member configured to be assembled on a door outer panel that forms an outer surface of a door;

a handle body configured to be mounted on the frame member via a first arm portion and a second arm portion, the handle body being configured to be rotatable relative to the frame member at the first arm portion; and a retainer mounted on the frame member and moveable between an assembly ready position and an assembly completion position, wherein, when the retainer is in the assembly ready position, the handle body is moveable within the frame member in a first direction, and wherein, when the retainer is in the assembly completion position, the retainer maintains the second arm portion of the handle body in cooperation with a door opening member mounted on the frame member;

a displacement member configured to displace the retainer from the assembly ready position to the assembly completion position in the first direction such that the retainer, in the assembly completion position, causes the second arm portion of the handle body to engage the door opening member to allow the door to be opened by an operation of the handle body, the displacement member being mounted on the frame member and configured to be actuated between a first position and a second position, wherein, in the second position, the displacement member maintains the retainer against the second arm portion of the handle body, wherein the retainer is moveable in translation between the assembly ready position and the assembly completion position in the first direction parallel to a gripping portion of the handle body when the door handle apparatus is mounted to the door outer panel, and wherein the retainer is disposed inside the door outer panel and between the displacement member and the second arm portion when the door handle apparatus is mounted to the door outer panel.

2. The door handle apparatus according to claim 1, wherein the displacement member comprises a threaded portion configured to cooperate with the frame member.

3. The door handle apparatus according to claim 1, wherein when the displacement member is actuated between the first and the second positions, the retainer is displaced from the assembly ready position to the assembly completion position respectively.

4. The door handle apparatus according to claim 3, wherein the displacement member comprises a threaded portion configured to cooperate with the frame member.

5. The door handle apparatus according to claim 3, wherein when the retainer is in the assembly ready position, the displacement member is in the first position and is in contact with the retainer.

6. The door handle apparatus according to claim 1, wherein when the retainer is in the assembly ready position, the displacement member is in the first position and is in contact with the retainer.

7. The door handle apparatus according to claim 6, wherein in the second position, the displacement member maintains the retainer against the second arm portion of the handle body.

8. The door handle apparatus according to claim 6, wherein the displacement member comprises a threaded portion configured to cooperate with the frame member.

9. The door handle apparatus according to claim 1, wherein in the second position, the displacement member maintains the retainer against the second arm portion of the handle body.

10. The door handle apparatus according to claim 9, wherein the displacement member comprises a threaded portion configured to cooperate with the frame member.

11. The door handle apparatus according to claim 1, comprising a lockset mounted on the frame member, the lockset being configured to be covered by the handle body.

12. The door handle apparatus according to claim 1, wherein the handle body is elongated and extends in the first direction.

13. The door handle apparatus according to claim 1, wherein when the retainer is in the assembly completion position, the handle body is moveable only between a cooperation position in which the second arm portion engages the door opening member and an opening position in which the door is opened.

14. The door handle apparatus according to claim 13, wherein the handle body is rotatable between the cooperation position and the opening position.

15. The door handle apparatus according to claim 1, wherein the displacement member, the retainer, and the second arm portion are aligned in a direction parallel to a gripping portion of the handle body when the door handle apparatus is mounted to the door outer panel.

16. The door handle apparatus according to claim 1, further comprising at least one of a lockset and a dummylock mounted on the frame member, wherein, in the second position, the displacement member secures the lockset or the dummylock relatively to the frame member and maintains the retainer in the assembly completion position.

17. The door handle apparatus according to claim 1, wherein the displacement member has a shape of a fork.

18. The door handle apparatus according to claim 1, wherein the displacement member is accessible when the handle body is in the pre-assembly position or the cooperation position.

19. The door handle apparatus according to claim 1, wherein the displacement member is accessible from a side of the frame member to be actuated between the first position and the second position.

20. The door handle apparatus according to claim 1, wherein the frame member includes a hole configured to allow access to the displacement member via a tool.

* * * * *